(12) United States Patent
Dertz et al.

(10) Patent No.: US 7,002,985 B2
(45) Date of Patent: Feb. 21, 2006

(54) METHOD AND APPARATUS FOR ORGANIZING AND SCHEDULING MULTIMEDIA DATA TRANSFERS OVER A WIRELESS CHANNEL

(75) Inventors: Gregory A. Dertz, Algonquin, IL (US); Alan P. Conrad, St. Charles, IL (US); Robert D. LoGalbo, Hoffman Estates, IL (US); John B. Preston, Plantation, FL (US); Tyrone D. Bekiares, Lake in the Hills, IL (US); Donald G. Newberg, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 951 days.

(21) Appl. No.: 09/760,985

(22) Filed: Jan. 16, 2001

(65) Prior Publication Data
US 2002/0093930 A1    Jul. 18, 2002

(51) Int. Cl.
H04L 12/43    (2006.01)
(52) U.S. Cl. ...................................... 370/458; 370/464
(58) Field of Classification Search ................ 370/229, 370/230, 235, 310, 351–356, 329, 314, 321, 370/326, 336, 337, 341, 347, 349, 431, 442, 370/443, 458, 462, 468, 471, 389, 395.42, 370/459, 464, 437
See application file for complete search history.

(56) References Cited

U.S. PATENT DOCUMENTS 5,515,379 A * 5/1996 Crisler et al. ............... 370/347
5,881,060 A * 3/1999 Morrow et al. ............. 370/337
6,011,790 A    1/2000 Fisher
6,148,204 A    11/2000 Urs et al.
2002/0099854 A1    7/2002 Jorgennsen

OTHER PUBLICATIONS

PCT (WO 00/33609): Landberg, Christer, An Access Control Mechanism for Packet Switched Communication Networks, Jun. 8, 2000.*

* cited by examiner

Primary Examiner—Brenda Pham
(74) Attorney, Agent, or Firm—Steven R. Santema; Indira Saladi

(57) ABSTRACT

A radio frequency communications system (100) includes wireless terminals (102) and base sites (104). The wireless terminals communicate with the base sites over a radio frequency channel (106). The base sites are interconnected to each other and other network elements via a packet network. The communication system has a radio frequency channel (400) with time slots (406, 408) for transmission of both delay-sensitive data, such as streaming audio and video, and non-delay-sensitive data. A method and apparatus are provided for determining whether a time slot in the radio frequency channel is to be allocated to delay-sensitive data or non-delay-sensitive data (704, 706, 708). Each packet of data transmitted over the wireless channel has a type of service field (900). The type of service field has a precedence or priority value (902) and a service type (904). The priority values are used to determine which packet should be transmitted across the radio frequency channel next and the service type determines the transmission protocol.

25 Claims, 8 Drawing Sheets

| | 1002 | 1004 | 1006 |
|---|---|---|---|
| | PRECEDENCE VALUE | DATA TYPE | EXAMPLES |
| 1008 | 111 | SESSION BASED CALL CONTROL | VOICE, VIDEO, CALL SETUP |
| 1010 | 110 | NETWORK CONTROL (ROUTER PROTOCOLS) | INTERNAL USE, MAINTENANCE VIDEO DATA |
| 1012 | 101 | HIGH PRIORITY TIME CRITICAL DATA | EMERGENCY VOICE AND VIDEO DATA |
| 1014 | 100 | NETWORK CONTROL (ROUTER PROTOCOLS) | NON-DELAY CRITICAL PACKET |
| 1016 | 011 | TIME CRITICAL DATA | VOICE AND VIDEO DATA |
| 1018 | 010 | HIGH PRIORITY DATA | EMERGENCY DATA, EMERGENCY DATABASE LOOK UP |
| 1020 | 001 | PRIORITY 1 LEVEL DATA | NON-EMERGENCY DATA, WEB BROWSING, DATABASE LOOK UP |
| 1022 | 000 | DEFAULT VALUE (BACKWARDS COMPATIBLE) | OTHER DATA |

| | 1102 | 1104 | 1106 | 1108 |
|---|---|---|---|---|
| | TOS FIELD | SERVICE TYPE | ERROR CORRECTION ON INCOMING AND OUTGOING CHANNEL | INCOMING CHANNEL MEDIA ACCESS METHOD |
| 1110 | 0000 | BEST EFFORT | DEFAULT FORWARD ERROR CORRECTION | RANDOM ACCESS |
| 1112 | 0001 | MINIMIZE DELAY | STRONG FORWARD ERROR CORRECTION | USE RESERVED, DELAY-SENSITIVE BANDWIDTH |
| 1114 | 0010 | MAXIMUM THROUGHPUT | NO FORWARD ERROR CORRECTION | USE RESERVED, DELAY-SENSITIVE BANDWIDTH |
| 1116 | 0100 | MAXIMUM RELIABILITY | BEST COMBINATION OF FORWARD ERROR CORRECTION AND RETRANSMISSION TECHNIQUES | RANDOM ACCESS |
| 1117 | 1000 | MINIMIZE MONETARY COST | DYNAMICALLY SELECT ERROR CORRECTION BASE ON CHANGES AND SIGNAL LEVELS | DYNAMICALLY SELECT MEDIA ACCESS METHOD (RESERVED OR RANDOM ACCESS) BASED ON CHANGES AND SIGNAL LEVELS |

METHOD AND APPARATUS FOR ORGANIZING AND SCHEDULING MULTIMEDIA DATA TRANSFERS OVER A WIRELESS CHANNEL

FIELD OF THE INVENTION

The invention generally relates to communications systems, and in particular, to a method and apparatus for organizing and scheduling multimedia data transfers over a wireless channel in order to support delay-sensitive, streaming data, such as audio and video data, and non-delay-sensitive data, such as Web pages.

BACKGROUND OF THE INVENTION

Wireless data communication systems for transmitting multimedia data, including audio, video and other data, are known. Recently, the explosion in the use of the Internet has dramatically increased multimedia data communication needs, including wireless data communication needs. Internet communications follow a packet-based protocol with wide variance in the size and frequency of packets. Generation of Internet packets generally occurs without regard to the actual physical networks that will carry the data. While this packet-based communication has great advantages, it presents numerous challenges for the efficient transmission of data over a particular physical network.

Known wireless data communication systems that support Internet access are typically a "retrofit" of Internet packets on top of an existing physical network. Unfortunately, these retrofits do not typically efficiently use bandwidth. And, performance is either sacrificed or uncontrolled, where performance includes parameters such as delay and jitter. Most existing systems over engineer the available bandwidth to accommodate a predefined maximum amount of traffic. Although this may be acceptable in wired networks, the limitations on wireless networks do not permit such a luxury. While all wireless packetized data presents some challenge, packetized audio and video streaming data is particularly challenging since the performance, namely, delay and jitter, may inhibit effective communications, in particular in the case of a two-way conversation.

Therefore, a need exists for a new paradigm in the communication of multimedia data over a wireless channel.

BRIEF DESCRIPTION OF THE DRAWINGS

FIG. 10 is a chart listing precedence values used to prioritize the transmission of packets in accordance with the present invention.

FIG. 11 is chart listing service types defined by a type of service field and explaining how the service types are transmitted over a wireless channel in accordance with the present invention.

DESCRIPTION OF THE PREFERRED EMBODIMENTS

Figure 1:
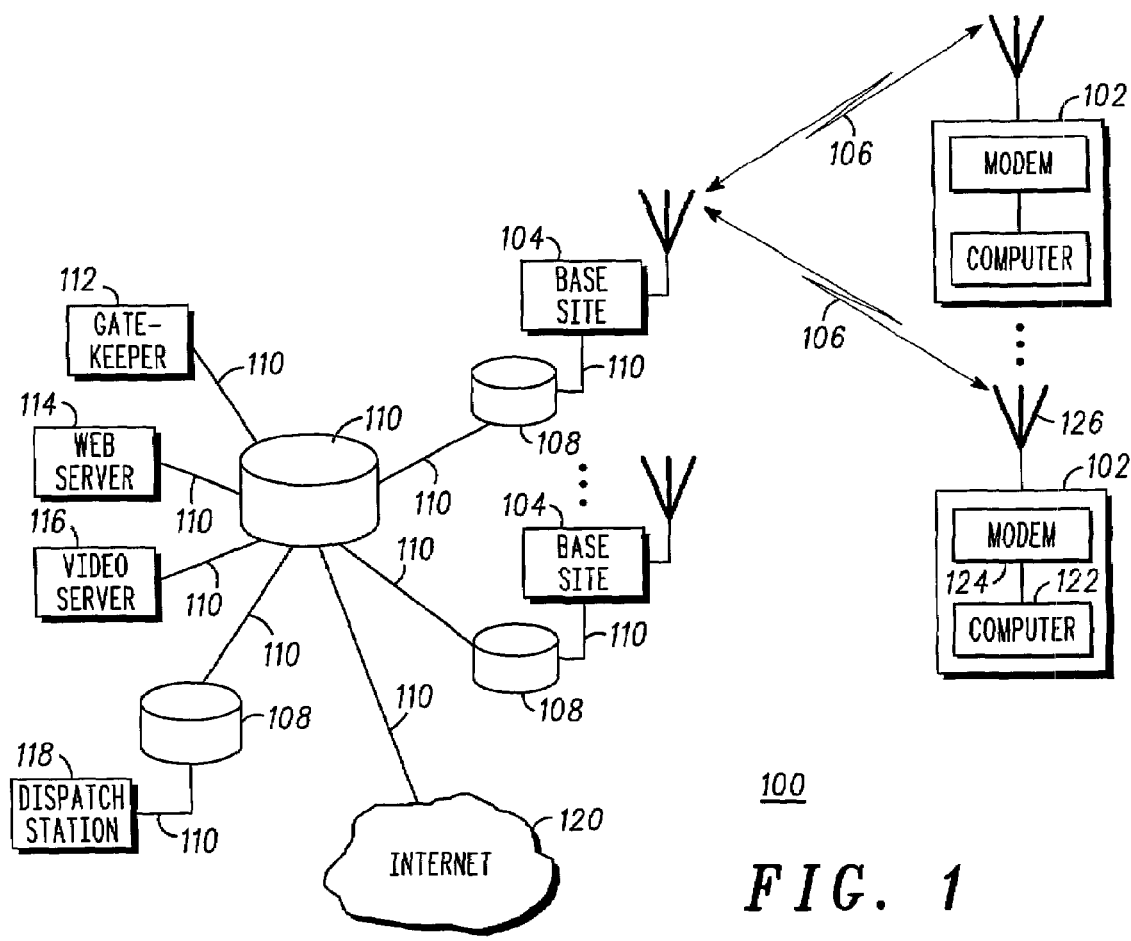
FIG. 1 is a block diagram of a wireless communications system in accordance with the present invention.

Briefly, in a wireless communication system having a wireless channel with time slots for transmission of both delay-sensitive data and non-delay-sensitive data, a method and apparatus are provided for determining whether a time slot in the wireless channel is to be allocated to delay-sensitive data or non-delay-sensitive data. First an ideal slot separation is determined for each delay-sensitive application using the wireless channel. Then, for each delay-sensitive application, a number of time slots since a time slot was granted to the delay-sensitive application is calculated. The number of slots since a time slot was last granted is compared with the ideal slot separation for the delay-sensitive application. A delay-sensitive time slot is allocated if a delay-sensitive application has the number of slots since a time slot was granted equal to or greater than the ideal slot separation for that delay-sensitive application. The delay-sensitive data time slot is granted to the delay-sensitive application that has its number of slots since a slot was granted the most above the ideal slot separation. That is, the delay-sensitive application that has waited the longest beyond its ideal slot separation is granted the delay-sensitive time slot on the wireless channel. Delay-sensitive time slots are granted on the wireless channel until there are no delay-sensitive applications at or beyond their ideal slot separation, meaning no delay-sensitive slot should be granted.

When no delay-sensitive slots are needed, non-delay-sensitive data slots are granted. Preferably there are non-delay-sensitive slots for acknowledgements, random access and nonspecific non-delay-sensitive data. After a determination that there are no delay-sensitive slots needed, a determination is made as to whether any acknowledgement slots are needed. Acknowledgement slots are provided in the wireless channel to acknowledge transmitted packets. If no acknowledgement slots are currently needed in the wireless channel, then a determination is made as to whether any nonspecific non-delay-sensitive data slots are needed. If needed, nonspecific non-delay-sensitive data slots are granted on the wireless channel unless a maximum time period between random access slots has occurred. Random access slots are the means by which wireless terminals request channel resources, i.e., delay-sensitive slots and non-delay-sensitive slots. Therefore, random access slots must be provided periodically to guarantee access to the wireless channel.

Each packet has a precedence or priority value and a service type. The priority values are used to determine among multiple packets waiting for transfer, the packet that should be transmitted next. Where multiple packets are suitable for a particular transmission, packets with the highest priority values are transmitted first. The service types are used to determine an error protocol and a channel access method for the packet. The priority values are set based on the content of the packet. For example, emergency data may be given priority over non-emergency data of the same type. Delay-sensitive data, such as audio and video data, may be given priority over non-delay-sensitive data. A default value of priority is provided for backward compatibility with software and systems not using priority values. Preferably, five service types are defined corresponding to the five service types used in an Internet protocol: (1) best effort; (2) minimize delay; (3) maximize throughput; (4) maximize reliability; and (5) minimize monetary cost.

FIG. 1 is a block diagram of a preferred embodiment of a multimedia communication system 100 in accordance with the present invention. System 100 includes wireless terminals 102 and radio base sites 104. Wireless terminals 102 communicate over the air with base sites 104. More specifically, wireless terminals 102 and base sites 104 use a radio frequency communications channel, illustrated by arrows 106, to communicate multimedia data, for example, audio, video and other data, to and from each other.

Base sites 104 are radio frequency transmitters and receivers that communicate with wireless terminals 102. In addition, base sites 104 are connected to a network of other elements to facilitate the transmission of data, including multimedia data. As shown in FIG. 1, base sites 104 are connected to routers 108 for the communication of data. Other network elements are interconnected to routers 108 for the transmission of data throughout the network. In FIG. 1, a gatekeeper 112, a Web server 114, a video server 116 and dispatch station 118 are shown interconnected to form a network. These network elements may form a closed private network, such as an intranet and may include access to a public network such as the Internet 120. Communication links 110 couple the various routers and network elements to each other. Any suitable communication links or trunks suffice for communication links 110. In a preferred embodiment, communications links 110 are Ethernet or other communication links, such as T1 communication links.

Gatekeeper 112 is preferably a computer that provides control and management functions associated with the wireless channel used for communication between wireless terminals 102 and base sites 104. Dispatch station 118 is preferably a computer that provides access for the dispatcher role associated with the wireless communication systems used for communication between base sites 104 and wireless terminals 102. Web server 114 is preferably a computer that provides a data communications function such as the provision and access to Web pages. Video server 116 is preferably a computer that provides video services to network elements, including wireless terminals 102 and dispatch station 118.

Wireless terminals 102 preferably include a computer 122 coupled to a modem 124. Modem 124 preferably is connected to an antenna 126 to radiate and receive radio frequency signals to implement the wireless communication channel between wireless terminals 102 and base sites 104. Preferably computer 122 implements an Internet protocol which generates packets that are transferred to modem 124. Modem 124 then converts the IP packets into packets or blocks for transmission over the wireless channel using antenna 126 and an associated protocol for the wireless channel.

In accordance with the present invention, the wireless channel provided for communication between wireless terminals 102 and base sites 104 is managed in a manner to provide efficient bandwidth for diverse communications between wireless terminals 102 and base sites 104. In particular, the wireless channel is managed to provide delay-sensitive data with guaranteed bandwidth over the channel and to accommodate non-delay-sensitive data over the same channel. The provision of these functions is discussed below with respect to the preferred embodiments.

Figure 2:
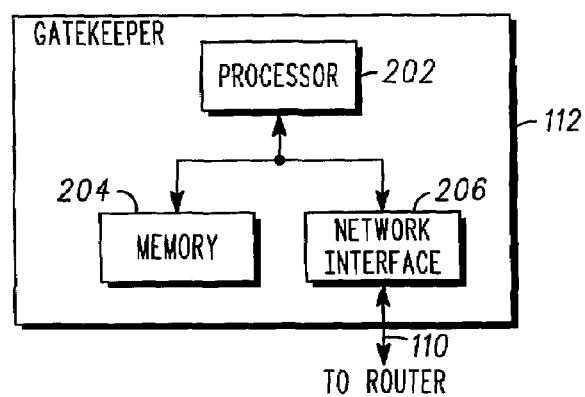
FIG. 2 is a block diagram of a gatekeeper for controlling wireless multimedia communications in accordance with the present invention.

FIG. 2 is a block diagram of a preferred embodiment of gatekeeper 112. Gatekeeper 112 is preferably a server-class, processor-based system. Gatekeeper 112 includes a processor 202, a memory 204 and a network interface 206. Processor 202, memory 204 and network interface 206 are coupled together for the communication of data and commands between these components. Processor 202 executes a program stored in memory 204 to implement various functions, including management and control functions to determine and allocate resources associated with a wireless channel used for communication between wireless terminals 102 and base sites 104. Processor 202 communicates with network interface 206 for the receipt and transmission of data over the associated network. Network interface 206 includes a connection to communication link 110.

Figure 3:
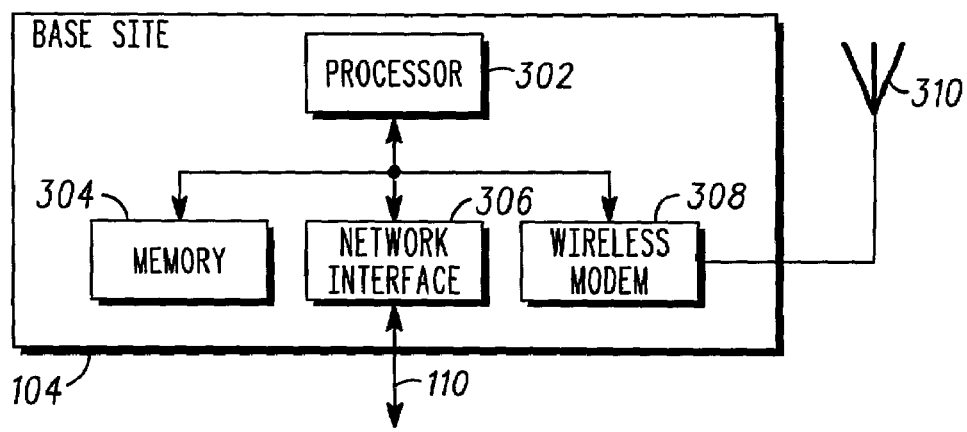
FIG. 3 is a block diagram of a radio base site for wireless multimedia communications in accordance with the present invention.

In a preferred embodiment, processor 202 preferably is a central processing unit, microprocessor, microcontroller, digital signal processor, or any combination of these. Memory 204 preferably includes volatile and non-volatile memory, including dynamic random access memory, and disk storage. Preferably, network interface 206 implements a TCP/IP network interface for the transmission of Internet protocol (IP) packets FIG. 3 is a block diagram of a preferred embodiment of a base site 104 in accordance with the present invention. Base site 104 includes processor 302, memory 304, network interface 306, wireless modem 308 and antenna 310. Processor 302, memory 304, network interface 306 and wireless modem 308 are coupled or interconnected together for the communication of data and commands between these components. Processor 302 executes programs stored in memory 304 for functions of the base site, including control over wireless modem 308, which provides control over the wireless channel coupling base site 104 with wireless terminals 102. Antenna 310 receives and radiates radio frequency signals to implement the wireless channel between wireless terminals 102 and base sites 104. Antenna 310 is connected to wireless modem 308. Network interface 306, under control of processor 302, provides access for base site 104 to other network elements. Network interface 306 is connected to communication link 110.

Figure 4:
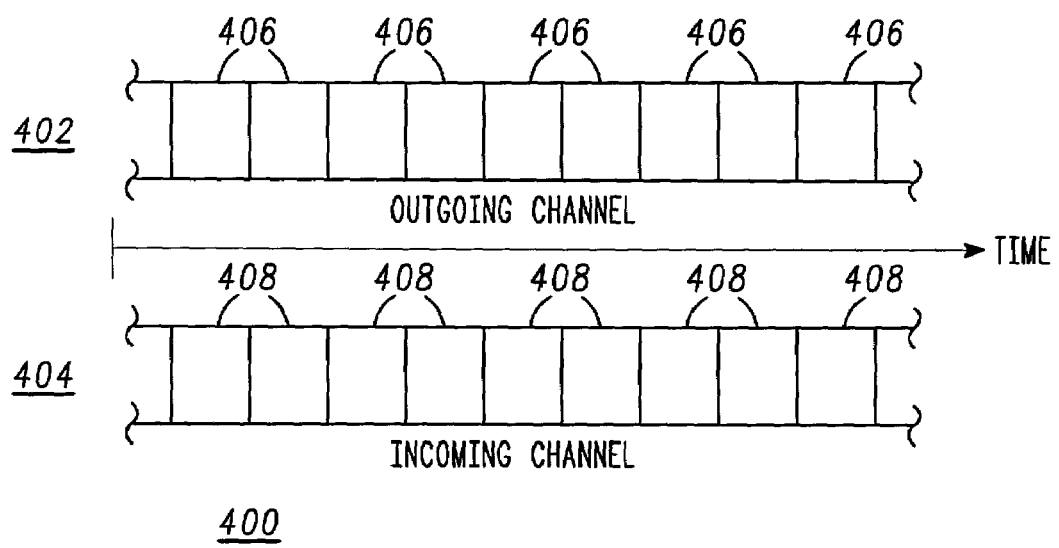
FIG. 4 is a schematic diagram illustrating an incoming and outgoing wireless channel in accordance with the present invention.

FIG. 4 is a schematic diagram illustrating a preferred wireless radio frequency channel in accordance with the present invention. Wireless channel 400 preferably includes an outgoing channel 402 and an incoming channel 404. Outgoing channel 402 represents the transmission of data from a base site 104 over the air to a plurality of wireless terminals 102. Incoming channel 404 represents a transmission from a plurality of wireless terminals 102 to a base site 104. As an alternative to using a separate incoming and outgoing channel, time division multiplexing may be used to accommodate both incoming and outgoing communications in a single channel. Also, frequency division and multiplexing are alternatively applied to the channel.

Outgoing channel 402 is divided into slots 406, which occur contiguously over a period of time. Similarly, incoming channel 404 is divided into slots 408, which occur contiguously over a period of time. In the preferred embodiment, outgoing channel 402 has 100 to 400 slots per second occurring where each slot is capable of transmitting about 206 bytes of data. Incoming channel 404 preferably has characteristics that match outgoing channel 402. In a preferred embodiment, a frequency of 746 to 806 megahertz (MHz) is used for wireless channel 400.

To facilitate orderly and efficient use of channel 400 by wireless terminals 102 and base sites 104, slots 406, 408 are preferably organized into slot types, which define a type of data that is transmitted in a particular slot. In contrast to conventional time-division multiplexed channels, slots 406, 408 are not strictly periodically assigned to a particular device or function, rather the assignment of slot types is made selectively and dynamically in a manner to flexibly accommodate varying media and data types. The four slot types defined in a preferred embodiment are random access slots, acknowledgement "ACK" slots, delay-sensitive slots, and non-delay-sensitive slots.

The random access slots are included in incoming channel 404 to allow wireless terminals 102 to reserve or request delay-sensitive slots and non-delay-sensitive slots. Random access slots are also used to transmit data. The random access slots are preferably a slotted-aloha type of slot that is used by wireless terminals 102 as a point of access. In other words, the random access slots are used by wireless terminals to alert a device managing the channel that the wireless terminal has data to be transferred over another slot type. The random access slots are, as the name suggests, randomly accessed by wireless terminals when available, without any arbitration. This allows for the occurrence of collisions between contending wireless terminals.

The delay-sensitive slots carry, as the name suggests, delay-sensitive, streaming data, such as a video data stream or an audio data stream. The non-delay-sensitive slots are allocated for data that is not delay-sensitive, for example Web site pages and the like. Non-delay-sensitive data typically is tolerant of some delay. The non-delay-sensitive slots are used for file transfer and the transmission of other error-intolerant data. The ACK slots are used for the wireless terminals 102 and base sites 104 to acknowledge safe receipt of packets sent over channel 400.

Each wireless terminal 102 and base site 104 has a unique media access control (MAC) address that identifies the device. Since there is competition among the wireless terminals to access the incoming channel slots 408, access must be controlled in some manner. In a preferred embodiment, a channel scheduler is implemented using processor 302, memory 304 and wireless modem 308 to orderly schedule access to incoming slots 408 by wireless terminals 102. More specifically, the channel scheduler determines the allocation of delay-sensitive slots, non-delay-sensitive slots, and ACK slots to particular wireless terminals 102. Most preferably, the outgoing channel 402 includes designations within its slots that specify which incoming channel slots 408 may be used by a particular wireless terminal 102. That is, a wireless terminal 102 determines which incoming slots 408 it may use by decoding this information from a portion of the outgoing channel 402. The random access slots are not dedicated to a particular wireless terminal 102, and therefore may be accessed by any wireless terminal 102. If more than one wireless terminal 102 transmits on a random access slot, a collision occurs, and the access is not subsequently acknowledged. This requires the transmitting wireless terminals 102 to retransmit on another available random access slot, preferably with some random time delay to reduce subsequent collisions.

The outgoing channel 402 has only one transmitter, base station 104. Therefore, there is no contention for transmission on outgoing channel 402. Each wireless terminal 102 that is communicating with channel 400 is required to listen to a portion of outgoing channel 402 and respond to data directed to it, as determined by the MAC address.

Figure 5:
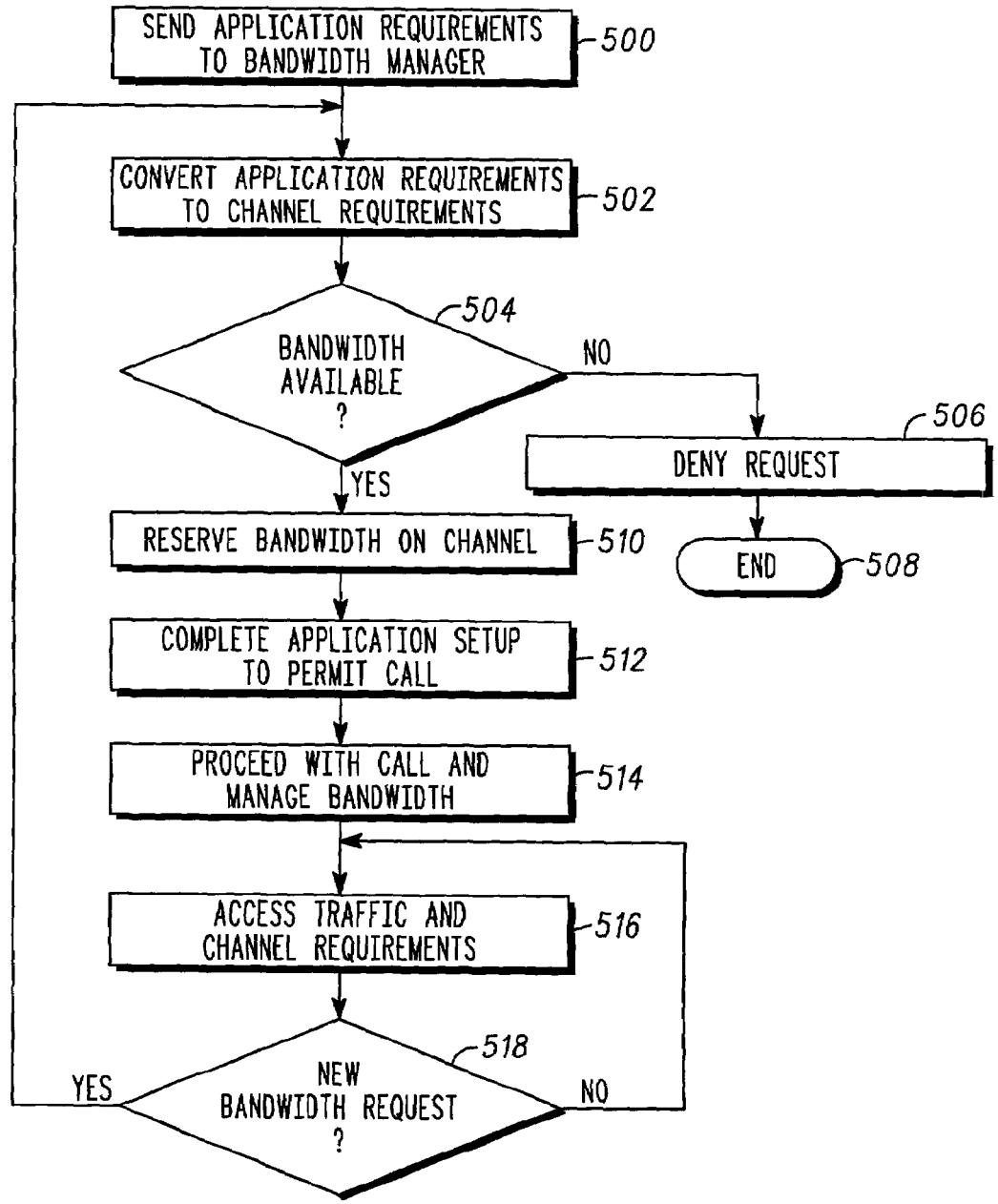
FIG. 5 is a flow chart illustrating a method for determining and reserving bandwidth allocation over a wireless multimedia channel in accordance with the present invention.

A method for allocating or reserving resources on channel 400 for delay-sensitive applications such as audio and video transmission, is described below with respect to FIG. 5. This method is described below in the context of a preferred embodiment described above with respect to FIGS. 1–4.

First a delay-sensitive application's requirements are sent to a bandwidth management device (500). This preferably occurs by an application on wireless terminal 102 initiating the transfer of data to other network elements. An exemplary application is an H.323 multimedia call that needs to be placed by a computer 122 of a wireless terminal 102. In accordance with the H.323 standard, certain requirements for the application, such as multimedia call type, codec, codec parameters and traffic profile are generated per the application. If the data transmission is to be directed over the wireless channel, then the modem 124 must initiate an access to the channel. Preferably, the communications between the physical network, modem 124, and the H.323 application occur via a layered network protocol.

Preferably, the access to the channel to transfer the application requirements requires that the wireless terminal 102 gain access to the incoming channel 404. To gain access, wireless terminal 102 must transmit on a random access slot the requirements for the desired application. If the random access slot transmission of the application requirements is successful, that is, there are no collisions, then the request is routed to gatekeeper 112, which preferably serves as the bandwidth management device. Another network element, such as base site 104, alternatively serves as the bandwidth management device.

After gatekeeper 112 receives the application requirements (500), gatekeeper 112 converts the application requirements to channel requirements (502). This requires converting the specified application requirements, such as multimedia call type, codec, codec parameters and traffic profile, into channel resources, that is, slots per second, that will be required for the delay-sensitive application. The actual mapping of application requirements to channel requirements varies. Any suitable alternative is available for converting the application requirements to the channel requirements, including a look-up table indexed on an application requirement or an algorithm to dynamically convert the application requirements to the channel requirements. Preferably, a prior analysis of application requirements or exemplary applications is used to provide a fixed mapping from application requirements to channel requirements, that is, slots per second required.

After the channel bandwidth requirement, in terms of slots per second, is determined (502), the bandwidth management device, gatekeeper 112, determines if the required number of slots per second is available on channel 400. Gatekeeper 112 stores data relating to the amount of bandwidth, or slots per second, available on channel 400. A comparison of the amount of bandwidth being currently used with the amount of bandwidth desired for the new delay-sensitive application determines whether there is bandwidth available on the channel. If the channel requirements cannot be met with the available bandwidth, then the applications request for transmission over the network is denied (506). This terminates the request and call (508), leaving the wireless terminal with the option to retry the request.

On the other hand, if the required channel bandwidth is available (504), then the needed bandwidth, that is, slots per second, is reserved on the channel (510). A method by which bandwidth is actually reserved varies depending upon the actual implementation. A preferred method for allocating the required bandwidth is discussed in detail below with respect to FIG. 6. In summary, the preferred method of allocating the delay-sensitive bandwidth requires that a channel scheduler allocate the requesting wireless terminal a certain number or percentage of delay-sensitive slots in the incoming channel to support the application.

After the bandwidth is reserved on the channel (510), the application set up can be completed such that the application will proceed with the call (512). Continuing with the H.323 example of an audio/video call, after gatekeeper 112 determines that bandwidth is available (504) and has been reserved (510), a message is sent to the wireless terminal 102 that initiated the request (500). The H.323 application is notified that it should proceed with the call. This message from gatekeeper 112 is sent to wireless terminal 102 via the outgoing channel from base site 104.

After application set up is complete (512), the application proceeds with the call and the system 100 manages the bandwidth accordingly. More specifically, the application on the wireless terminal generates IP packets in accordance with the application and without regard to the channel requirement. These IP packets generated by computer 122 are transferred to modem 124 for formatting and transmission over the incoming channel 404 of wireless channel 400. Typically the IP packets generated by the application must be transmitted in multiple slots over wireless channel 400. Modem 124 repackages the IP packets into slots for the wireless channel. After the data is repackaged for the channel slots, the wireless terminal 102 transmits the channel specific packets in the delay-sensitive slots that are granted to that particular wireless terminal 102.

As the call proceeds and packets are transmitted by the wireless terminal to the communication system 100, the communication system 100 preferably continually assesses the traffic and channel requirements (500). That is, gatekeeper 112, the bandwidth management device, preferably keeps or receives a count of the actual slots per second used by the application. This reflects the actual channel utilization used by the application. This actual channel utilization is preferably compared with the predicted channel bandwidth that is allocated or reserved to determine if an adjustment should be made to the bandwidth allocation. In accordance with this comparison adjustments are preferably made.

In a preferred embodiment as described above, where channel slots are allocated on a device basis, if additional applications require delay-sensitive slots for an application on the device, then a new bandwidth request must be made (518). This new bandwidth request mirrors the request made in step 500, described above. Based on the new bandwidth request, new channel requirements are determined (502) and the call is allowed to proceed if the new bandwidth request can be satisfied (504). If the additional bandwidth is not available, the request for a call is denied (506, 508). If the new bandwidth request can be satisfied, then the bandwidth is reserved (510); the application is set up (512); and the call proceeds (514).

Figure 6:
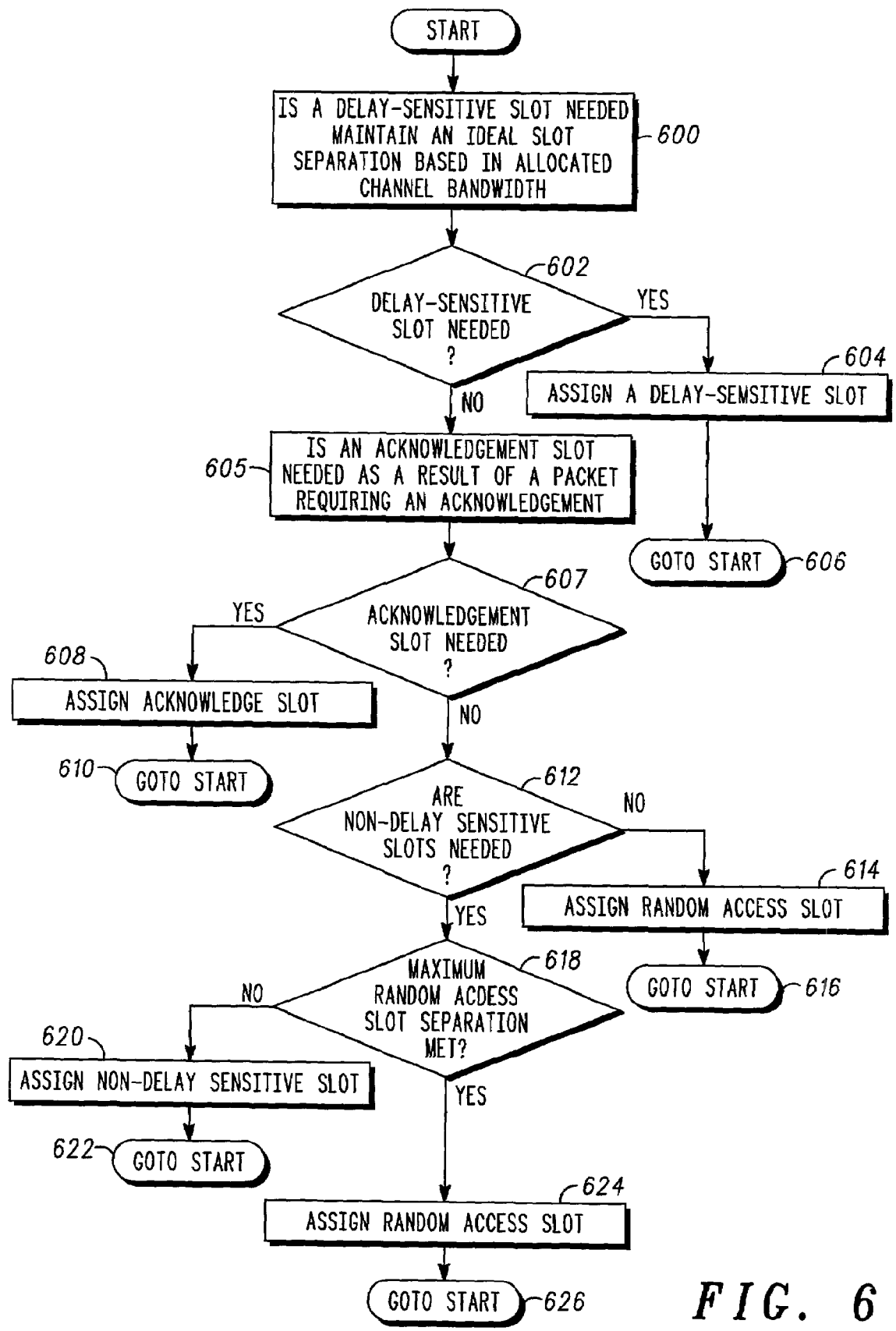
FIG. 6 is a flow chart illustrating a method for determining how a time slot in a wireless channel will be allocated in accordance with the present invention.

FIG. 6 is a flow chart illustrating a method for determining the type of slot that will be scheduled next on the incoming channel 404. More specifically, the channel scheduler determines whether the next slot in the incoming channel should be scheduled as a delay-sensitive slot, a non-delay-sensitive slot, an ACK slot or a random access slot. This slot scheduling determines the channel resources that are dedicated to the slot type. Also, the method guarantees that the allocated or reserved bandwidth for delay-sensitive, streaming data such as audio and video, is maintained.

First the channel scheduler determines whether a delay-sensitive slot should be scheduled next to maintain an ideal slot separation based on the allocated or reserved channel bandwidth for delay-sensitive applications (600). The ideal slot separation is calculated by dividing the total number of slots that occur in one second on the incoming channel by the number of slots per second allocated or reserved for delay-sensitive applications for a particular wireless terminal. For example, for an incoming channel running at 100 slots per second, a wireless terminal that has delay-sensitive applications requiring 20 slots per second results in an ideal slot separation of five slots. Delay-sensitive slots should be scheduled to meet the ideal slot separation for a wireless terminal or if the time has passed for a delay-sensitive slot to be allocated to maintain the ideal slot separation, then a delay-sensitive slot is needed (602). A preferred method for calculating ideal slot separation and determining whether a delay-sensitive slot is required is discussed below with respect to FIG. 7. If a delay-sensitive slot is needed (602), then a delay-sensitive slot is assigned to the next available slot on the incoming channel 404 (604). The method then restarts to determine what the next slot should be (606).

If a delay-sensitive slot is not required (602) then the channel scheduler preferably determines whether an acknowledgment slot is needed (605). The channel scheduler is aware of whether a particular transfer during a slot represents the completion of an application packet, such as an IP packet. For IP packets that require an acknowledgement, the channel scheduler notes when the last slot of the packet data is transmitted and hence knows that an acknowledgement slot should be allocated to acknowledge receipt of the packet. If an acknowledgement slot is required (607), then the next slot is assigned as an acknowledgment slot (608). After the slot assignment is made, the method restarts for a determination of the next slot type (610).

If no acknowledgment slot is needed (607) then the channel scheduler determines whether there are any non-delay-sensitive slots needed (612). The scheduler is aware of the wireless terminals 102 requirements for non-delay-sensitive transfers by virtue of the requests to send non-delay-sensitive transfers, which requests are made over the random access slots. If no outstanding non-delay-sensitive requests are awaiting transfer, then the scheduler knows there are no non-delay-sensitive slots needed, and therefore, assigns the next slot as a random access slot (614). After assigning the random access slot the method restarts to determine the next available slot (616).

If on the other hand, there are non-delay-sensitive slots needed by a wireless terminal, then the scheduler determines whether a maximum random access slot separation has been met (618). The maximum random access slot separation is a predetermined number of non-delay-sensitive slots that may occur before a random access slot is granted. The maximum random access slot separation is used to insure that random access slots, which serve as the point for initiating access by wireless terminals, occur at regular intervals over the incoming channel. If the maximum random access slot separation has not been met (618), then the next slot is assigned a non-delay-sensitive slot (620). After this slot assignment, the method returns to start to determine the next slot (622). On the other hand, if the maximum random access slot separation has been met (618) indicating that the maximum period between random access slots has occurred, then a random access slot is assigned (624). After this slot assignment is made, the method restarts for a determination of the next slot (626).

In a preferred embodiment of the invention, the maximum random access slot separation is stored by the channel scheduler and a counter is initialized to zero after any random access slot is granted. The random access slot counter is incremented by 1 for every non-delay-sensitive slot that is granted after the random access slot is granted. A comparison between the random access slot counter and the maximum random access slot separation value is made to determine whether the maximum random access slot separation has been met. When the maximum random access slot separation is met, then a random access slot is assigned, rather than a non-delay-sensitive slot, as discussed above.

Figure 7:
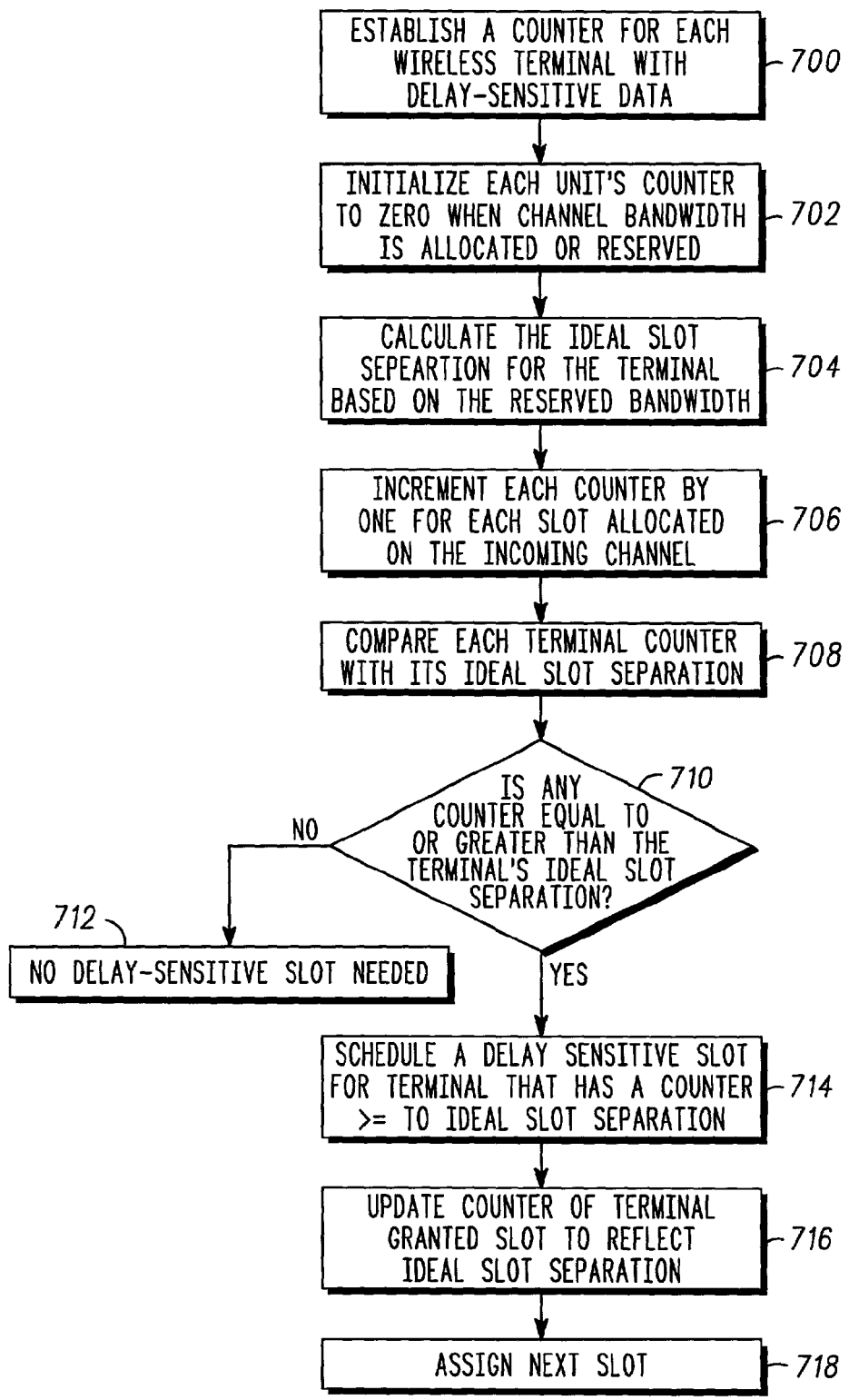
FIG. 7 is a flow chart illustrating a method for determining whether a delay-sensitive slot is needed in a wireless channel in accordance with the present invention.

FIG. 7 is a flow chart illustrating a preferred method for determining whether a delay-sensitive slot is needed on the incoming channel as described in steps 600 and 602 of FIG. 6. First, a counter is established for each wireless terminal with delay-sensitive data (700). As discussed above with respect to FIG. 5, wireless terminals that need to transmit delay-sensitive data, such as audio and video data, receive an allocation of channel bandwidth in accordance with the applications requirements.

Each counter for a wireless terminal is initialized to zero when the channel bandwidth is allocated or reserved for that terminal (702). The ideal slot separation for each terminal is calculated based on the reserved channel bandwidth (704). The ideal slot separation for a terminal is calculated by dividing the total number of slots that occur in one second on the incoming channel by the number of slots per second reserved or allocated to a particular terminal (see FIG. 5).

Each counter for each terminal is incremented by one for each slot that occurs on the incoming channel (706). That is, each counter keeps up with the number of slots occurring on the incoming channel since a slot was granted to the particular wireless terminal. For each slot allocation, the channel scheduler compares each terminal's counter with the terminal's ideal slot separation (708). If none of the terminal's counters is equal to or greater than the terminal's ideal slot separation (710), then no delay-sensitive slot needs to be scheduled by the channel scheduler (712). (See step 602 of FIG. 6).

If, on the other hand, any terminal's counter is equal to or greater than the terminal's ideal slot separation (710), then a delay-sensitive slot should be scheduled for the terminal that has its counter value equal to or greater than the ideal slot separation (714). It is possible that more than one wireless terminal will have its counter equal to or greater than the terminal's ideal slot separation at any slot. In this case, the channel scheduler preferably selects one of the terminals to be assigned the delay-sensitive slot. Most preferably, a channel scheduler selects the terminal that has a counter value that exceeds its ideal slot separation by the greatest amount. Ties are resolved by any suitable method that guarantees fair access.

For the wireless terminal that is granted the delay-sensitive slot, its counter is updated or re-initialized with the difference obtained from subtracting the ideal slot separation for that terminal from the counter value at the time the delay-sensitive slot was granted (716). In other words, the counters keep a count of the slots occurring since the last granted slot for a terminal. Once a terminal is granted a slot, the counter must be reset. To accommodate situations where a terminal's counter exceeds the ideal slot separation due to contention from other terminals, the counter is reset with a value that accounts for the wait time for the terminal, which allows the counter to maintain the ideal slot separation. For example, if a wireless terminal's ideal slot separation is 10 and due to contention, the counter for that terminal reaches 12 prior to the terminal being granted a slot, then after a slot is granted to the terminal, the counter is reset with a value of 2 (12–10) such that the new counter value is used to attempt to readjust the time for the next granted slot so that the average time is close to the ideal slot separation. After the delay-sensitive slot is assigned, the next slot assignment is determined (718).

Figure 8:
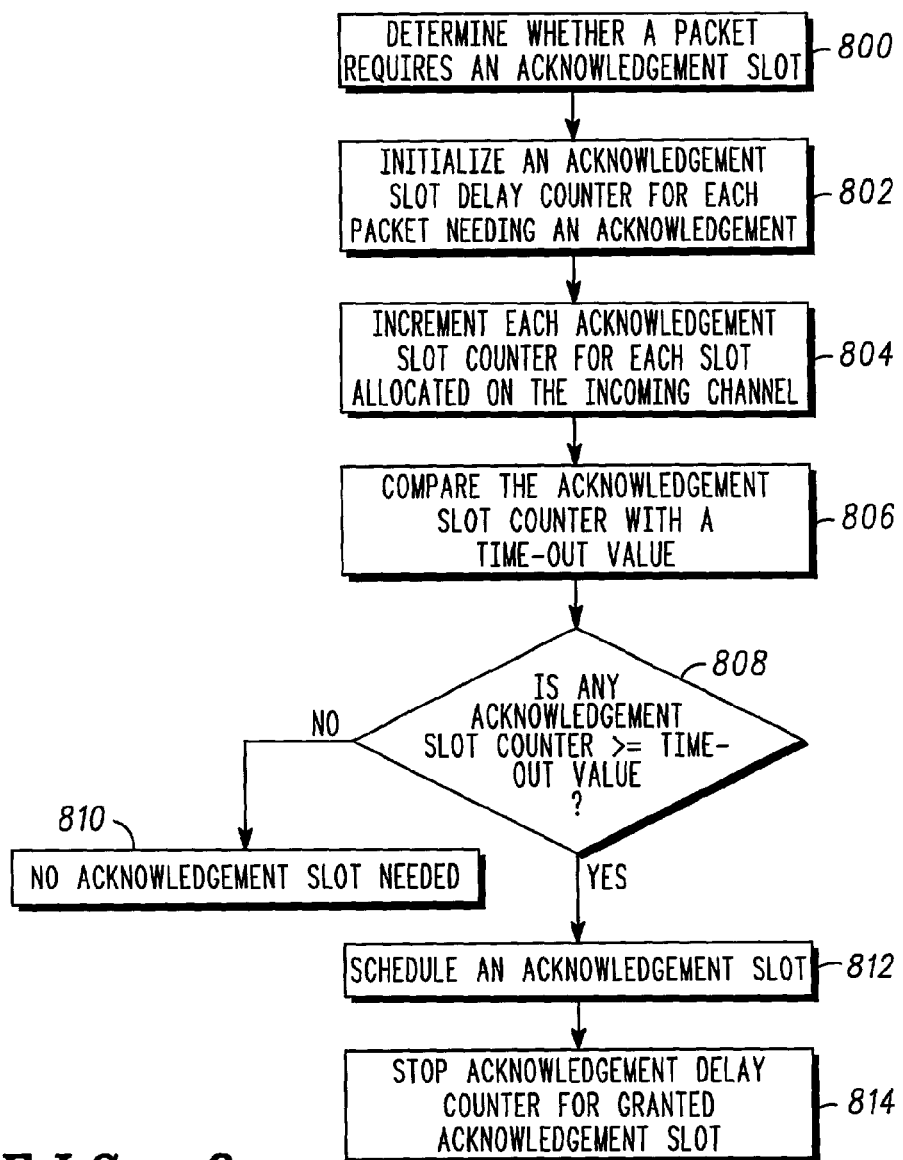
FIG. 8 is a flow chart illustrating a method for determining whether an acknowledgement slot is needed in a wireless channel in accordance with the present invention.

FIG. 8 is a flow chart illustrating a method for determining whether an ACK slot is needed for the incoming channel as described in steps 605 and 607 of FIG. 6. First, the channel scheduler determines whether an incoming slot includes an end of packet indication for a packet requiring an acknowledgment slot (800). For each end of packet slot found that requires an ACK slot, an acknowledgement slot delay counter is initialized with a value of zero (802). Each acknowledgement slot delay counter is incremented for each slot allocated on the incoming channel (804). That is, the acknowledgment slot delay counter counts the number of slots occurring since a scheduler determined an acknowledgment slot was required.

As each slot is allocated on the incoming channel, a comparison is made of the acknowledgment slot delay counters with an acknowledgment slot time out value (806). The acknowledgement slot time out value is a predetermined value entered into the system. The acknowledgement slot time out value reflects an ideal time for acknowledgments to be made. If no acknowledgement slot delay counter has reached the acknowledgement slot time out value (808), then no acknowledgement slot needs to be scheduled on the incoming channel. If on the other hand, an acknowledgment slot delay counter is equal to or greater than the acknowledgement slot time out value (808), then an ACK slot should be scheduled on the incoming channel (812). After an acknowledgment slot is granted for a corresponding acknowledgement slot delay counter, then the counter is stopped or ignored (814).

Figure 9:
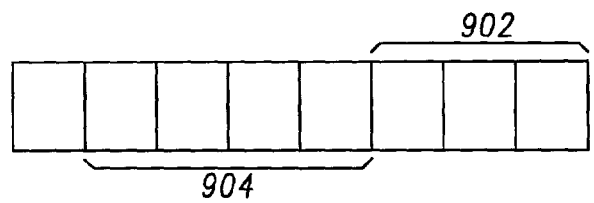
FIG. 9 is a schematic diagram illustrating a type of service field that is used to prioritize the transmission of packets in accordance with the present invention.

FIG. 9 is a schematic diagram illustrating a preferred type of service field that is used in Internet packets in accordance with the present invention. An 8-bit type of service field 900 is partition such that three bits are use for a precedence value 902 and four bits are use for a service type 904. A type of service field is defined by Internet protocol standards. In particular IPv4 defines a type of service field for inclusion in Internet packets. However, the standard does not completely specify a set of precedence values that are applicable for sending time-sensitive (delay-sensitive), streaming data and non-time-sensitive data. In accordance with the invention, the precedence values are defined in a manner to set priority levels applicable to time-sensitive, streaming data, such as video and audio, as well as emergency and other data. In addition, IPv4 defines five different service types. These service types are defined as minimize delay, maximize throughput, maximize reliability, minimize monetary cost, and best effort. In accordance with the present invention, these service types are made applicable to a wireless channel. The service type definitions determine the protocol used to transmit data over the wireless channel to accommodate inherent characteristics of wireless channels.

FIG. 10 is a chart 1000 illustrating precedence values for a preferred arrangement in accordance with the invention. Chart 1000 includes a precedence value column 1002, a data type column 1004, and an examples column 1006. Precedence value column 1002 list the precedence values in base two notation. The precedence values are used to set priorities for a particular packet. The higher the precedence value, the higher priority the packets. Therefore, for example, the precedence value of 6 is of higher priority, and in the case of contention, is sent before a packet with a precedence value of 2. The precedence values are placed in the type of service field 900 at the source of packet generation. The precedence values 1002 are used by any apparatus that must select a packet for transmission, for example, a wireless modem that must select among packets to be transmitted over a wireless channel. The data type column 1004 list the type of data that is generally associated with a particular precedence value. The examples column 1006 list examples of application data that use a particular precedence value.

Chart 1000 shows 8 precedence values, 7 through 0. Row 1008 lists a precedence value of 7, which is the highest priority precedence value. The data type that is preferred for a precedence value of 7 is session based call control data, as listed in row 1008, column 1004. Examples of this data include packets used to set up a voice, audio or video call. Row 1010 lists a precedence value of 6. The data type preferred for this precedence value is network-control data for router protocols, as defined by the existing art. Examples of this data include internal maintenance download data. Row 1012 lists a precedence value of 5. The data type preferred for this precedence value is high priority time critical data, such as emergency voice and video data. Row 1014 lists a precedence value of four. The preferred data type for this precedence value is network-control data for router protocols, as defined by the existing art. Exemplary data used for this precedence value includes non-delay critical packets. Row 1016 lists a precedence value of three, which preferably is used for time-critical (delay-sensitive) data, for example voice and video data. Row 1018 lists a precedence value of 2, which is preferably used for higher priority data, for example, emergency data from an emergency database query. Row 1020 lists a precedence value of 1, which is preferably used for non-emergency data, such as Web browser data and non-emergency database queries. Row 1022 lists a precedence value of zero, which is the lowest priority precedence value and is also a default value inserted into packets not using any particular priority protocol. The zero precedence value allows for backward compatibility with all Internet packets. Any data not otherwise specified for a precedence value of 1 through 7, uses a precedence value of the zero.

FIG. 11 is a chart 1100 illustrating the preferred manner and protocol used to send a particular packet based on the service type defined in the type of service field. Column 1102 lists the bit pattern that defines the particular service type. Column 1104 gives the name of the service type. Column 1106 lists the type of error correction that is applied for the service type on both the incoming and outgoing channel. Column 1108 lists the media access method (e.g., random access, delay-sensitive) used on the incoming channel. Notably, in the preferred embodiment, the outgoing channel does not have different media access methods. For incoming channel communications, the wireless modem on the wireless terminal uses the service type field to determine the type of error correction and the incoming channel media access method. For outgoing channel communications, the base station determines the type of error correction that is to be applied on the outgoing channel.

In the preferred arrangement, the best effort service type, which is shown in row 1110, uses a default forward error correction on the incoming and outgoing channel (see row 1110, column 1106) and uses a random access slot for incoming channel communications (see row 1110, column 1108). A preferred default forward error correction protocol is a three-quarter rate, convolutional code. Alternative default forward error correction protocols include BCH (Bose-Chaudhuri-Hocquenghem) codes (binary and non binary), Reed-Solomon, Golay, Hamming and other linear block and cyclical codes. By virtue of the error correction selection and the channel access method, the best effort service type provides an acceptable delay vs. reliability trade-off. The best effort service type is a default value, which provides backward compatibility for packets unaware of the service types specified according to the invention.

Preferably, the minimize delay service type, which is shown in row 1112, uses strong forward error correction on both the incoming and outgoing channel. The minimize delay service type uses reserved, delay-sensitive slots for the incoming channel media access method. A preferred protocol for strong forward error correction is a one-half rate, convolutional code. Alternative protocols for strong forward error correction include BCH (Bose-Chaudhuri-Hocquenghem) codes (binary and non binary), Reed-Solomon, Golay, Hamming and other linear block and cyclical codes. The minimize delay service type is preferably used for audio and video data.

Preferably, the maximize throughput service type, which is shown in row 1114, uses no forward error correction on both the incoming and outgoing channel. The maximize throughput service type uses reserved, delay-sensitive slots for the incoming channel media access method. The maximize throughput service type is preferably used for audio and video data, in particular, for audio and video protocols where error correction is handled in a network protocol layer higher than the physical layer protocol. Exemplary audio and/or video protocols are IMBE (Improved Multi-Band Excitation) and H.263 with annexes to include built-in error handling.

Preferably, the maximize reliability service type, which is shown in row 1116, uses the best combination of forward error correction and retransmission techniques for both the incoming and outgoing channels. This provides the highest degree of reliability. The incoming channel media access method is random access.

Preferably, the minimize monetary cost service type, which is shown in row 1117, dynamically selects error correction based on the transmission charges and signal levels. That is, an error correction protocol is selected on the basis of cost and the signal levels associated with the particular transmission. The incoming channel media access method is dynamically selected as reserved (delay-sensitive or non-delay-sensitive) or random access based on monetary charges and signal levels.

Figure 12:
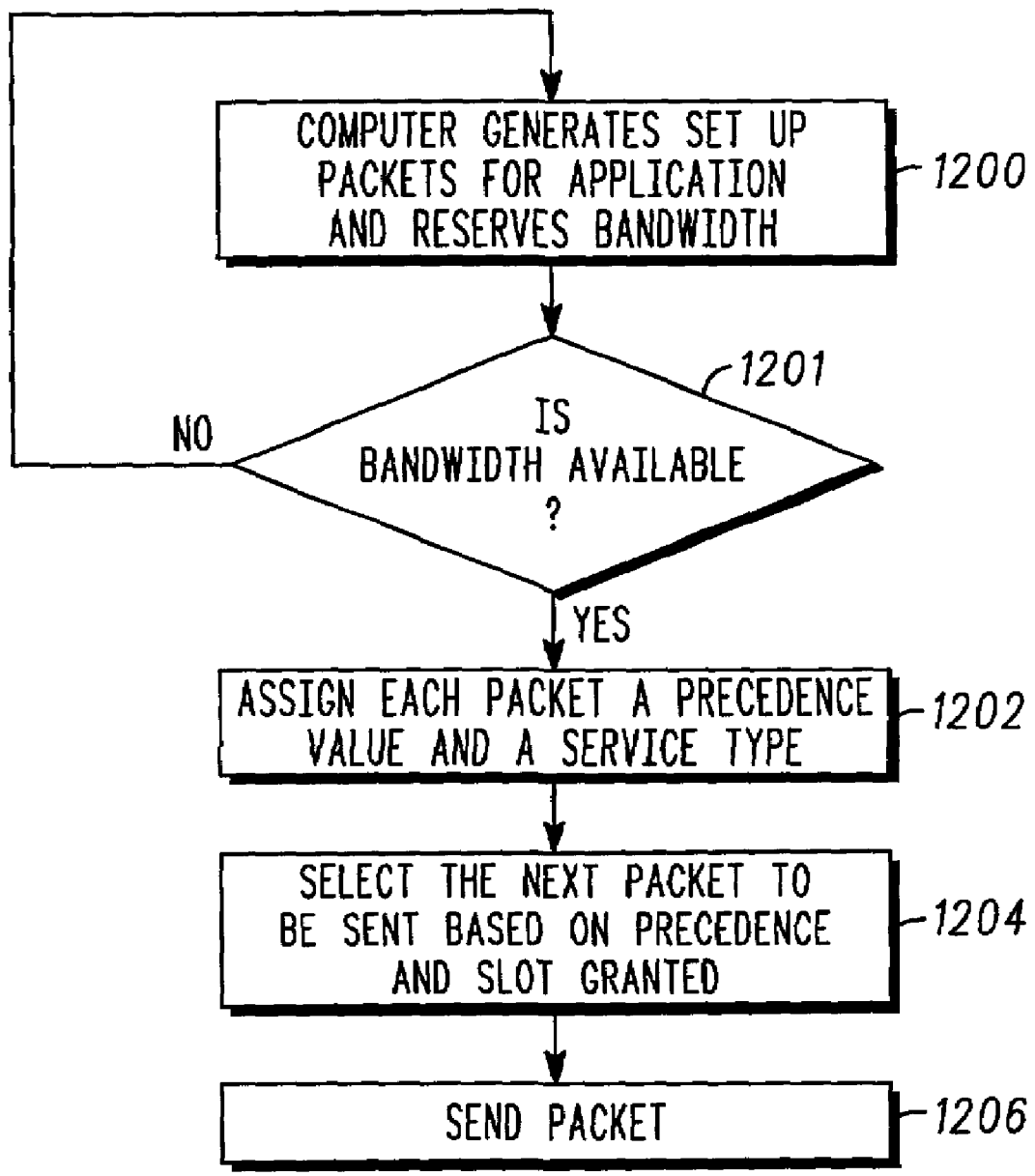
FIG. 12 is a flow chart illustrating a method for assigning precedence values and service types to packets in accordance with the present invention.

FIG. 12 is a flow chart illustrating a preferred method for sending packets over a wireless channel using the preferred type of service field 900. The method is described with reference to the preferred embodiments discussed above. First, a computer 122 of a wireless terminal 102 generates setup packets for a particular application and reserves bandwidth, if necessary (1200). For example, if an H.323 audio/video teleconference call is required, then setup packets must establish reserved, delay-sensitive bandwidth, as discussed above with reference to FIG. 5. In accordance with the preferred type of service field 900, the setup packets, when generated by computer 122, receive a type of service field 900. Based on the preferred definitions of the precedence value and service type given in FIGS. 10 and 11, the setup call packets receive a precedence value of 7 and a service type of maximize reliability, best efforts or minimize monetary cost, depending upon the nature of the audio/video call. For an emergency audio/video call, maximize reliability may be the appropriate service type. For a non-emergency audio/video call, the best effort service type may be appropriate. For an audio/video call seeking to minimize expense, the minimize monetary cost service type may be most appropriate. In any event, the precedence value is used by the wireless modem 124 to determine the priority for sending the setup call packets over the wireless channel. That is, the wireless modem 124 uses the precedence value to resolve any contention between multiple packets waiting to be sent over the wireless channel. The service type is used to determine the type of error correction and incoming channel media access method used for transmitting the packet or packets associated with setup.

If the setup procedure is successful (see FIG. 5), that is, bandwidth is available (1201), then data packets associated with the call are assembled and assigned a precedence value and service type (1202). For the audio/video call example, the preferred type of service definitions dictate a precedence value of five or three for the actual audio and video packets. A precedence value of five is selected if the audio and video data relates to an emergency. On the other hand, if the video and audio data is not related to an emergency, a precedence value of three is used. The service type selected for the audio and video data packets is either minimize delay or maximize throughput, according to the preferred definitions. If error correction and retransmission is controlled through the network layer protocols, as opposed to the physical layer protocols, then the maximize throughput service type may be most appropriate. On the other hand, if the audio video application protocols do not to have error correction built-in, then the minimize delay service type may be most appropriate. The minimize delay service type and the maximize throughput service type use reserved, delay-sensitive slots on the wireless channel.

After the type of service field is defined for the packet (1202), the wireless modem selects the packet that will be sent over the wireless channel next (1204). In particular, the wireless modem 124 determines which packet from a plurality of applications will be sent over the wireless channel based on the precedence value for the packet and the service type for the packet. Also, the wireless modem 124 determines which packet will be sent based on the type of slots scheduled by the channel scheduler (see FIG. 6). Finally, the packets are sent (1206).

Base site 104 checks the precedence values and service types of packets it receives for transmission on the outgoing channel. Base site 104 uses the precedence values to determine which packet is sent over the outgoing channel next. For both the wireless modem 124 and base site 104, if there are ties in precedence values, the oldest packet of the highest priority value is sent next over the wireless channel, assuming an appropriate slot type in the channel.

By virtue of the present invention, delay-sensitive applications, such as video and audio transmissions, are allocated bandwidth on a wireless channel to guarantee performance. The applications need not be aware of the wireless channel requirements or protocol. Delay-sensitive applications are allocated resources on the channel to guarantee a channel bandwidth to accommodate an application bandwidth. Packets to be transferred over the wireless channel use a type of service bit field to determine the priority of packets and an error correction and media access method. Advantageously, selective allocation of bandwidth permits efficient management of the wireless channel while guaranteeing performance.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described, Various alterations, modifications and variations will be apparent to those skilled in the art in light of the foregoing description, but embraces all such alterations, modifications and variations in accordance with the spirit and scope of the appended claims.

What is claimed is:

1. In a wireless communications system having a wireless channel with time slots for transmission of delay-sensitive data and non-delay-sensitive data, a method for determining whether a time slot in the wireless channel should be allocated for delay-sensitive data or non-delay-sensitive data, the method comprising the steps of:
   determining an ideal slot separation for each delay-sensitive application using the wireless channel;
   determining, for each delay-sensitive application, whether a number of slots since a time slot was granted to the each delay-sensitive application is equal to or greater than the ideal slot separation for the each delay-sensitive application; and
   assigning a time slot to carry delay-sensitive data for the each delay-sensitive application that has the number of slots since a time slot was granted to the each delay-sensitive application that is equal to or greater than the ideal slot separation for the each delay-sensitive application.

2. The method of claim 1 further comprises the step of:
   assigning a time slot to carry non-delay-sensitive data if each delay-sensitive application has the number slots since a time slot was granted to the each delay-sensitive application that is less than the ideal slot separation for the each delay-sensitive application.

3. The method of claim 1 further comprising the step of:
   determining whether an acknowledgement time slot needs to be allocated to acknowledge a packet sent over the wireless channel; and
   assigning a time slot for acknowledging the packet if the acknowledgement time slot needs to be allocated.

4. The method of claim 3 further comprising the step of:
   determining whether a non-delay-sensitive slot needs to be allocated; and
   determining whether a maximum time between random access time slots has been met or exceeded;
   assigning a time slot for a random access to the wireless channel if a non-delay-sensitive slot is not needed; and
   assigning a time slot for non-delay-sensitive data if a time slot is needed for non-delay-sensitive data and if the maximum time between random access slots has not been met or exceeded.

5. The method of claim 4 wherein the step of determining whether a non-delay-sensitive slot needs to be allocated further comprises determining whether the non-delay-sensitive slot is needed to accommodate transfers for pending applications using the wireless channel.

6. The method of claim 3 wherein the step of determining whether an acknowledgement slot is needed comprises the steps of:

detecting whether a packet transferred over the wireless channel requires an acknowledgement;

determining whether an acknowledgement time out value has occurred since detecting that an acknowledgement slot is required;

determining that an acknowledgement slot is needed if an acknowledgement time our value has occurred.

7. The method of claim 6 wherein the step of determining whether an acknowledgement time out value has occurred further includes the steps of:

initializing a counter for each packet that needs an acknowledgement slot;

incrementing the counter for each slot that occurs on the wireless channel;

comparing the counter with the acknowledgement timeout value to determine whether the counter is equal to or greater than the acknowledgement timeout value.

8. The method of claim 1 wherein determining the ideal slot separation for each delay-sensitive application further includes dividing a total number of slots that occur in one second over the wireless channel by a number of slots per second allocated to the each delay-sensitive application.

9. The method of claim 1 wherein the step of determining, for each delay-sensitive application, whether a number of slots since a time slot was granted to the each delay-sensitive application is equal to or greater than the ideal slot separation for the each delay-sensitive application further comprises the steps of:

initializing a counter for each delay-sensitive application;

incrementing the counter by one for each slot occurring on the wireless channel; and comparing the counter for each delay-sensitive application with the ideal slot separation for the each delay-sensitive application.

10. The method of claim 9 further comprising the steps of:

updating the counter for a delay-sensitive application that is granted a delay-sensitive slot with a number of slots that occurred beyond the ideal slot separation for the delay-sensitive application.

11. The method of claim 1 comprising the steps of:

determining a service type for each packet to be transmitted over the wireless channel;

selecting a protocol for transmitting each packet over the wireless channel based on the service type, wherein the protocol includes a type of error correction.

12. The method of claim 11 wherein the protocol includes a method for accessing the wireless channel.

13. The method of claim 12 wherein the method of accessing the wireless channel includes accessing the channel using a time slot allocated to delay-sensitive data.

14. In a wireless communications system having a wireless channel with time slots for transmission of delay-sensitive data and non-delay-sensitive data, an apparatus for determining whether a time slot in the wireless channel should be allocated for delay-sensitive data or non-delay-sensitive data, the apparatus comprising:

a processor that:

determines an ideal slot separation for each delay-sensitive application using the wireless channel;

determines, for each delay-sensitive application, whether a number of slots since a time slot was granted to the each delay-sensitive application is equal to or greater than the ideal slot separation for the each delay-sensitive application; and assigns a time slot to carry delay-sensitive data for the each delay-sensitive application that has the number of slots since a time slot was granted to the each delay-sensitive application that is equal to or greater than the ideal slot separation for the each delay-sensitive application.

15. The apparatus of claim 14 wherein the processor:

assigns a time slot to carry non-delay-sensitive data if each delay-sensitive application has the number slots since a time slot was granted to the each delay-sensitive application that is less than the ideal slot separation for the each delay-sensitive application.

16. The apparatus of claim 14 wherein the processor:

determines whether an acknowledgement time slot needs to be allocated to acknowledge a packet sent over the wireless channel; and assigns a time slot for acknowledging the packet if the acknowledgement time slot needs to be allocated.

17. The apparatus of claim 16 wherein the processor:

determines whether a non-delay-sensitive slot needs to be allocated; and determines whether a maximum time between random access time slots has been met or exceeded;

assigns a time slot for a random access to the wireless channel if a non-delay-sensitive slot is not needed; and assigns a time slot for non-delay-sensitive data if a time slot is needed for non-delay-sensitive data and if the maximum time between random access slots has not been met or exceeded.

18. The apparatus of claim 17 wherein the processor:

determines whether the non-delay-sensitive slot is needed to accommodate transfers for pending applications using the wireless channel.

19. The apparatus of claim 16 wherein the processor determines whether an acknowledgement slot is needed by:

detecting whether a packet transferred over the wireless channel requires an acknowledgement;

determining whether an acknowledgement time out value has occurred since detecting that an acknowledgement slot is required; and determining that an acknowledgement slot is needed if an acknowledgement time out value has occurred.

20. The apparatus of claim 19 wherein determining whether an acknowledgement time out value has occurred further includes the processor:

initializing a counter for each packet that needs an acknowledgement slot;

incrementing the counter for each slot that occurs on the wireless channel;

comparing the counter with the acknowledgement timeout value to determine whether the counter is equal to or greater than the acknowledgement timeout value.

21. The apparatus of claim 14 wherein the processor determines the ideal slot separation for each delay-sensitive application by dividing a total number of slots that occur in one second over the wireless channel by a number of slots per second allocated to the each delay-sensitive application.

22. The apparatus of claim 14 wherein the processor determines, for each delay-sensitive application, whether a number of slots since a time slot was granted to the each delay-sensitive application is equal to or greater than the ideal slot separation for the each delay-sensitive applications by:
  initializing a counter for each delay-sensitive application;
  incrementing the counter by one for each slot occurring on the wireless channel; and
  comparing the counter for each delay-sensitive application with the ideal slot separation for the each delay-sensitive application.

23. The apparatus of claim 22 wherein the processor: updates the counter for a delay-sensitive application that is granted a delay-sensitive slot with a number of slots that occurred beyond the ideal slot separation for the delay-sensitive application.

24. The system of claim 14 comprising:
  a processor that:
    determines a service type for each packet to be transmitted over the wireless channel; and
  a wireless modem coupled to the processor that:
    selects a protocol for transmitting each packet over the wireless channel based on the service type, wherein the protocol includes a type of error correction.

25. The method of claim 24 wherein the protocol includes a method for accessing the wireless channel.

* * * * *

UNITED STATES PATENT AND TRADEMARK OFFICE
CERTIFICATE OF CORRECTION

| | | |
|---|---|---|
| PATENT NO. | : 7,002,985 B2 | |
| APPLICATION NO. | : 09/760985 | |
| DATED | : December 6, 2005 | |
| INVENTOR(S) | : Dertz et al. | |

It is certified that error appears in the above-identified patent and that said Letters Patent is hereby corrected as shown below:

Col. 18 claim 26, Line 12-13, please add claim 36, which will become claim 26, as follows: --The method of claim 25 wherein the method of assessing the wireless channel includes accessing the channel using a time slot allocated to delay-sensitive data.--

Signed and Sealed this

Fifth Day of January, 2010

David J. Kappos
*Director of the United States Patent and Trademark Office*